(12) United States Patent
Nystrom et al.

(10) Patent No.: US 7,094,304 B2
(45) Date of Patent: Aug. 22, 2006

(54) METHOD FOR SELECTIVE AREA STAMPING OF OPTICAL ELEMENTS ON A SUBSTRATE

(75) Inventors: Michael J. Nystrom, San Jose, CA (US); Annette C. Grot, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 135 days.

(21) Appl. No.: 10/698,210

(22) Filed: Oct. 31, 2003

(65) Prior Publication Data

US 2005/0093186 A1    May 5, 2005

(51) Int. Cl.
*B29D 31/00*    (2006.01)
(52) U.S. Cl. ............ 156/242; 156/249; 156/275.5; 156/295; 264/1.38; 264/1.7; 264/2.5
(58) Field of Classification Search ......... 156/242, 156/245, 247, 249, 272.2, 275.5, 289, 295; 427/487, 508, 516, 532, 553, 558; 264/1.36, 264/1.38, 1.7, 2.5
See application file for complete search history.

(56) References Cited

U.S. PATENT DOCUMENTS

| | | | |
|---|---|---|---|
| 4,512,848 A | | 4/1985 | Deckman et al. |
| 4,566,930 A | * | 1/1986 | Uehara ............... 156/280 |
| 5,597,613 A | * | 1/1997 | Galarneau et al. ....... 427/162 |
| 6,280,660 B1 | * | 8/2001 | Takakuwa et al. ....... 264/1.33 |
| 6,610,166 B1 | | 8/2003 | Harden et al. |
| 6,618,200 B1 | | 9/2003 | Shimizu et al. |
| 6,653,157 B1 | * | 11/2003 | Kondo ............... 438/22 |
| 6,700,708 B1 | * | 3/2004 | Houlihan et al. ........ 359/618 |
| 6,730,459 B1 | * | 5/2004 | Nishikawa et al. ....... 430/321 |
| 6,814,897 B1 | * | 11/2004 | Morita ............... 264/1.33 |
| 2002/0118465 A1 | | 8/2002 | Hosoe |
| 2004/0090571 A1 | * | 5/2004 | Fujita ................ 349/95 |

FOREIGN PATENT DOCUMENTS

| | | |
|---|---|---|
| EP | 0 911 144 A2 | 4/1999 |
| EP | 1 054 270 A1 | 11/2000 |
| JP | 09090360 | 4/1997 |

* cited by examiner

*Primary Examiner*—Jeff H. Aftergut
*Assistant Examiner*—John L. Goff

(57) ABSTRACT

Selective area stamping of optical elements may be performed to make multiple micro-optic components on one or two sides of a substrate may be fabricated using a batch process. The presence of molding material may be controlled on the substrate through the use of gaps.

20 Claims, 15 Drawing Sheets

METHOD FOR SELECTIVE AREA STAMPING OF OPTICAL ELEMENTS ON A SUBSTRATE

BACKGROUND

Micro-optic components are typically used in imaging or optical interconnect applications. Conventionally, such optical components are manufactured by directly etching the desired shape into a suitable substrate using standard lithography and semiconductor processing techniques or by building a mold to allow injection molding of a thermoplastic to create the optical component. The first method creates an environmentally stable optical component but is typically slow and expensive. The second method rapidly creates parts but is limited to thermoplastics that are unstable at elevated temperatures.

BRIEF SUMMARY OF THE INVENTION

In accordance with the invention, multiple micro-optic components on one or two sides of a substrate may be fabricated using a batch process. The substrate may then be diced into individual lens assemblies. A large number of optical lenses may be molded from an optically curable polymer on a suitable substrate. Alternatively, a thermally curable polymer may be substituted for the optically curable polymer. The substrate may be then diced into individual lens assemblies. This typically allows finished lens assemblies to have the mechanical properties of the substrate. Metal alignment marks and optical elements may be patterned onto the substrate prior to optical lens fabrication.

Typically, selective area stamping of optical lenses allows various optical elements to be combined on a substrate by using multiple simple molds and processes optimized for element function, mold shape and size. Different materials optimized for different optical elements may be used. If lenses are molded from a continuous layer of polymer as opposed to selective area stamping in accordance with the invention, all optical elements would typically be formed at the same time, from the same material and by the same process. Selective area stamping allows easy singulation in accordance with the invention. In selective area stamping, the optically curable polymer is not contiguous over the substrate which decreases breakage during singulation.

DETAILED DESCRIPTION OF THE INVENTION

Figure 1A:
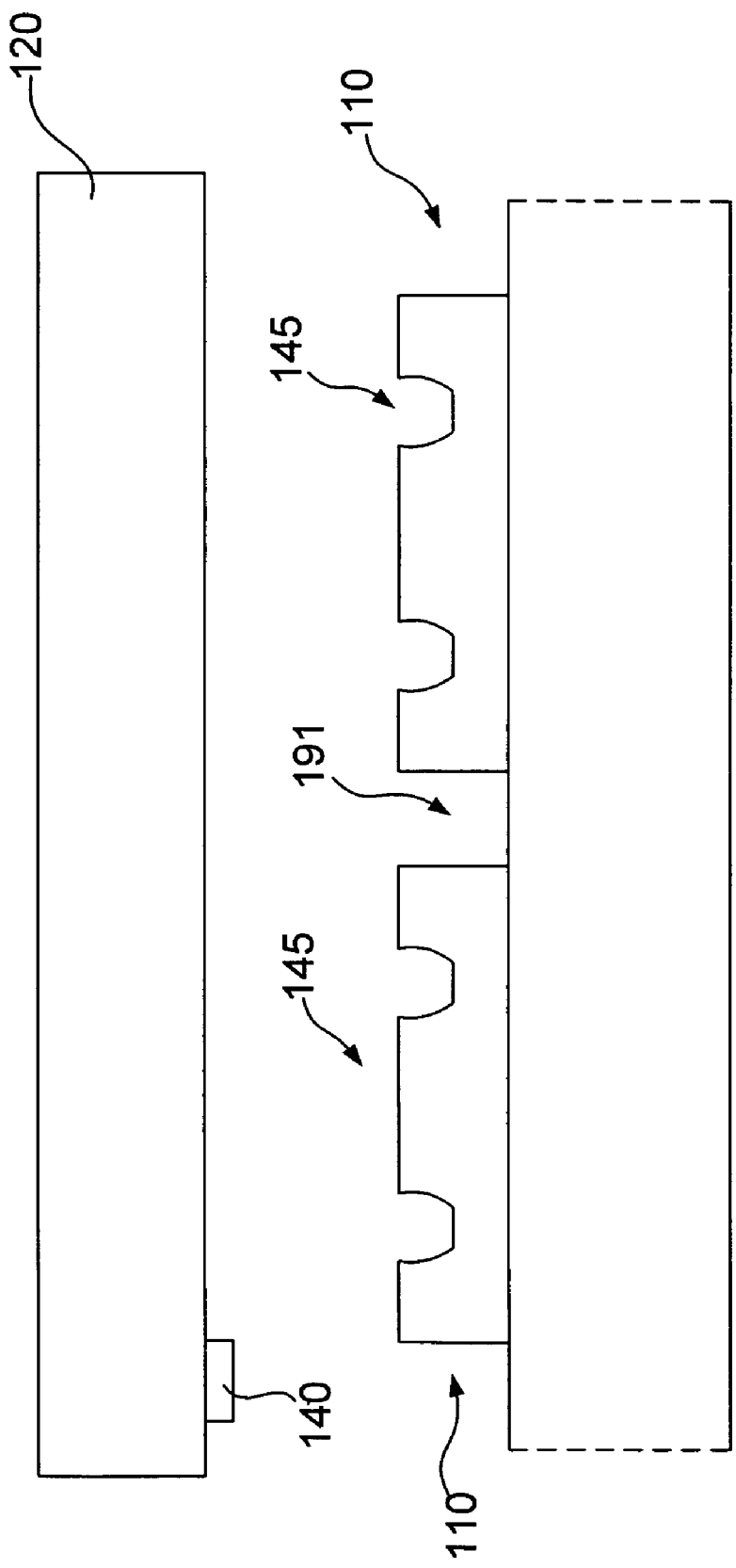
FIGS. 1a–1e show molding of micro-optic components from an optically curable polymer material in accordance with the invention.

FIGS. 1a–e show an embodiment in accordance with the invention. FIG. 1a shows stampers 110 which may be molded from a master or stampers 110 may be directly fabricated as the inverse of the desired lens profile. Molding stampers 110 from a master is described further below.

Substrate 120 typically has metal alignment mark 140 to provide for alignment of stampers 110 with substrate 120. Molds 145 for the optics in stampers 110 may be made larger than the desired optics to allow for the shrinkage in optically curable polymer 115 (see FIG. 1b) when cured. The use of molded polymer optics is typically less expensive than molding or etching lenses from inorganic materials such as glass. Optically curable polymer 115 may be a UV curable polymer such as J91® or SK-9® available from Summers Labs or NORLAND 61® available from Norland. Use of green initiators such as titanocene dichloride or blue initiators such as camphotoquinone, for example, allow curing under green or blue light conditions. With the use of the appropriate initiators curing can be shifted to different parts of the optical spectrum as desired.

Figure 1B:
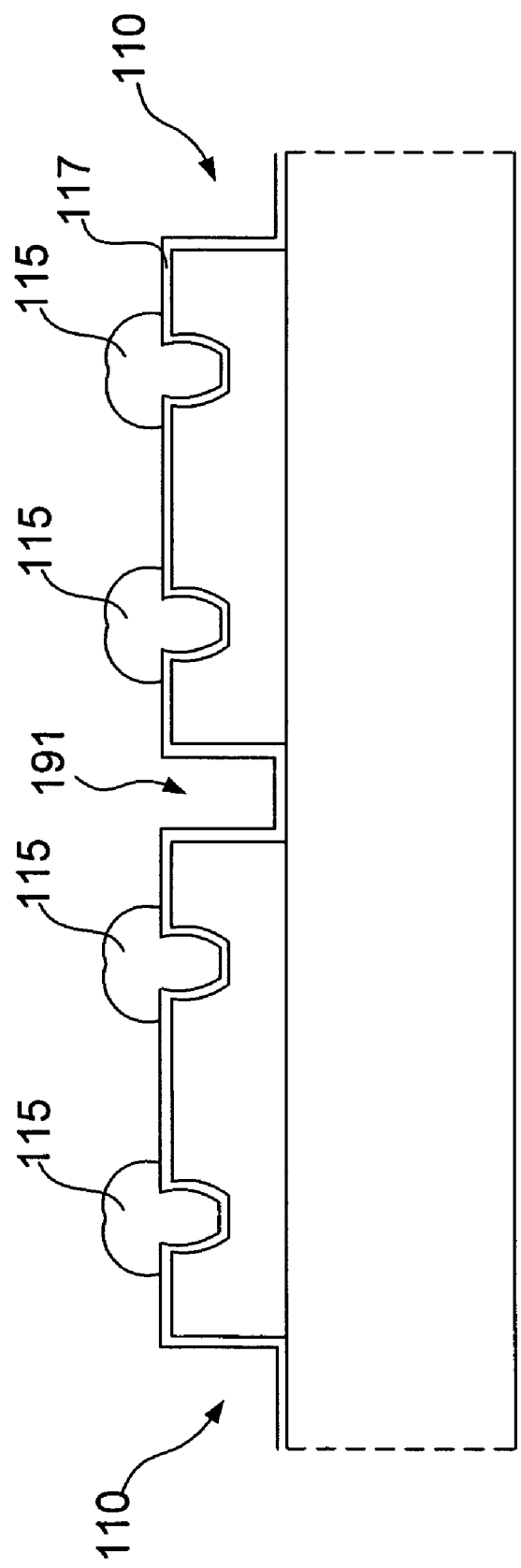

In accordance with an embodiment of the invention, stampers 110 are typically coated with release layer 117 as shown in FIG. 1b. Providing release layer 117 on stampers 110 prevents molded optics 159 from sticking to molds 145 instead of substrate 120. Release layers, such as release layer 117 are typically made from polytetrafluoroethylene (e.g. fluorinated carbon) non-stick type materials. Optically curable polymer 115 is locally dispensed onto stamper 110. For example, optically curable polymer 115 may be mechanically dispensed. In an embodiment, optically curable polymer 115 may be forced through a needle or other suitable orifice using mechanical pressure or gas or liquid pressure. In another embodiment, screen printing that forces optically curable polymer through holes in a suitable defined mask may be used.

In another embodiment, optically curable polymer 115 may be transferred to the surface of stampers 110 by contacting molds 145 of stampers 110 with a reservoir, such as a pool of optically curable polymer 115 or a porous material saturated with optically curable polymer 115 in a manner analogous to a stamping pad saturated with ink. Typically, care should be taken to control the amount of optically curable polymer 115 dispensed onto stampers 110 to ensure that coverage of optically curable polymer 115 is limited on substrate 120 once curing has occurred. Optionally, stampers 110 with optically curable polymer 115 as shown in FIG. 1b may be placed into a vacuum chamber in a degassing step to remove any trapped air pockets.

Figure 1C:
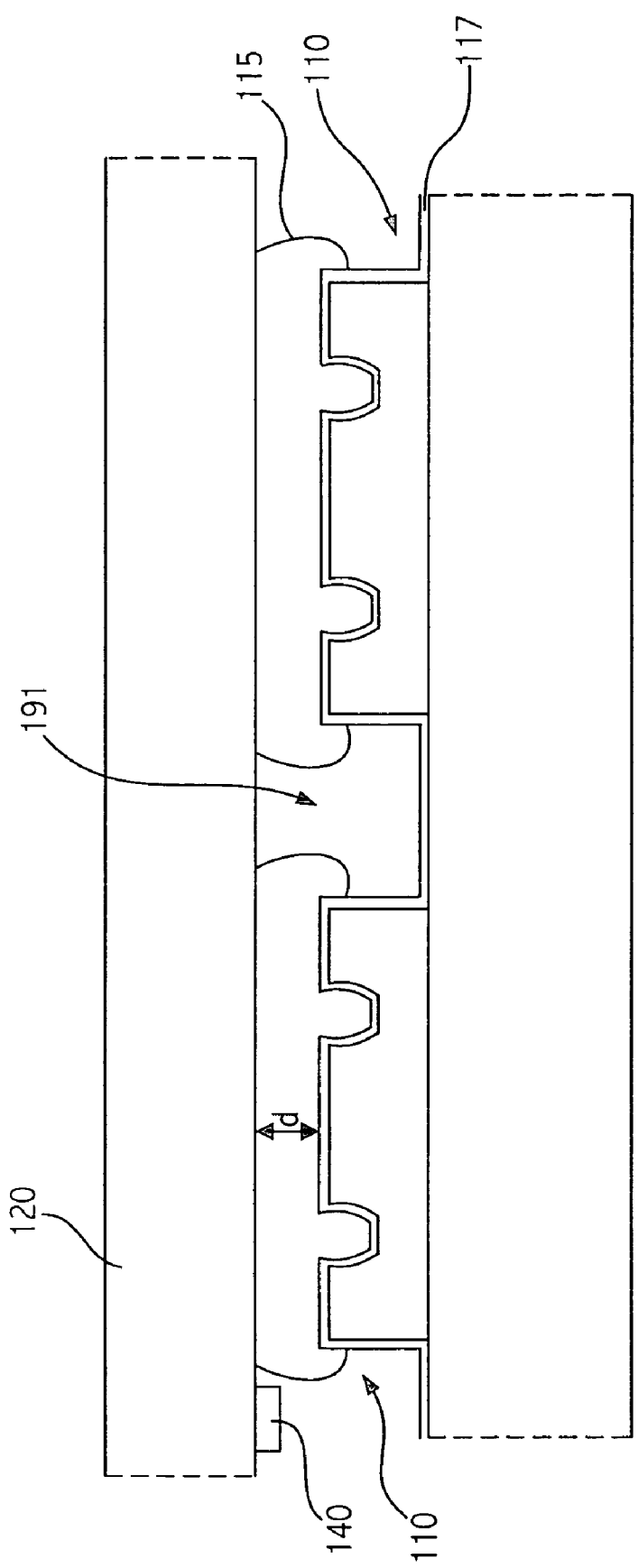

FIG. 1c shows the step of bringing locally optically curable polymer 115 coated stampers 110 into contact with substrate 120. Substrate 120 is typically a flat piece of material that serves a mechanical support function as well as an optical function. For example, substrate 120 may be substantially transparent in applications where light passes through the optical elements or reflective for optical elements that require reflection from the interface between substrate 120 and the optical elements. Substrate 120 may also be an active element such as a laser or detector. The surface of substrate 120 may be prepared prior to contact with locally optically curable polymer 115 coated stampers 110 to enhance adhesion of optically curable polymer 115 when cured.

The separation distance d between substrate 120 and molds 145, when optically curable polymer 115 begins to flow as substrate 120 and molds 145 are brought into contact with each other, typically determines the dimensions needed for gap 191 to function in accordance with the invention. The separation distance d sets the approximate height and area dimensions needed for the size of gap 191 so that excess optically curable polymer 115 will collect in gap 191 instead of forming a thick film over substrate 120. If gap 191 has the appropriate dimensions as determined from the separation distance d, optically curable polymer 115 will tend to move vertically up the sides of gap 191 as molds 145 and substrate 120 are brought together, reducing the thickness of the film formed on the surface of substrate 120. Use of release layer 117 enhances this effect. Gap 191 may be made larger than the dimensions described above to keep areas in and around elements such as semiconductor lasers on substrate 120 free from optically curable polymer 115.

Metal alignment mark 140 may be patterned on substrate 120 for alignment purposes and thin metal elements may be patterned on substrate 140 for optical functions such as, for example, a diffraction grating. Stampers 110 may be aligned to features present on substrate 120 prior to bringing stampers 110 into contact with substrate 120. Parallelism of stampers 110 and substrate 120 is typically controlled using the bonding equipment. Stampers 110 and substrate 120 in FIG. 1c may be held together through the use of an applied force or by the weight of substrate 120. Once substrate 120 and locally optically curable polymer 115 coated stampers 110 are in contact as shown in FIG. 1c, stamper 110, optically curable polymer 115 and substrate 120 are exposed to light to cure optically curable polymer 115. For creation of single sided optical elements, stampers 110 and substrate 120 are separated leaving molded optical element 190 on substrate 120 (e.g., see FIG. 1e).

Figure 1D:
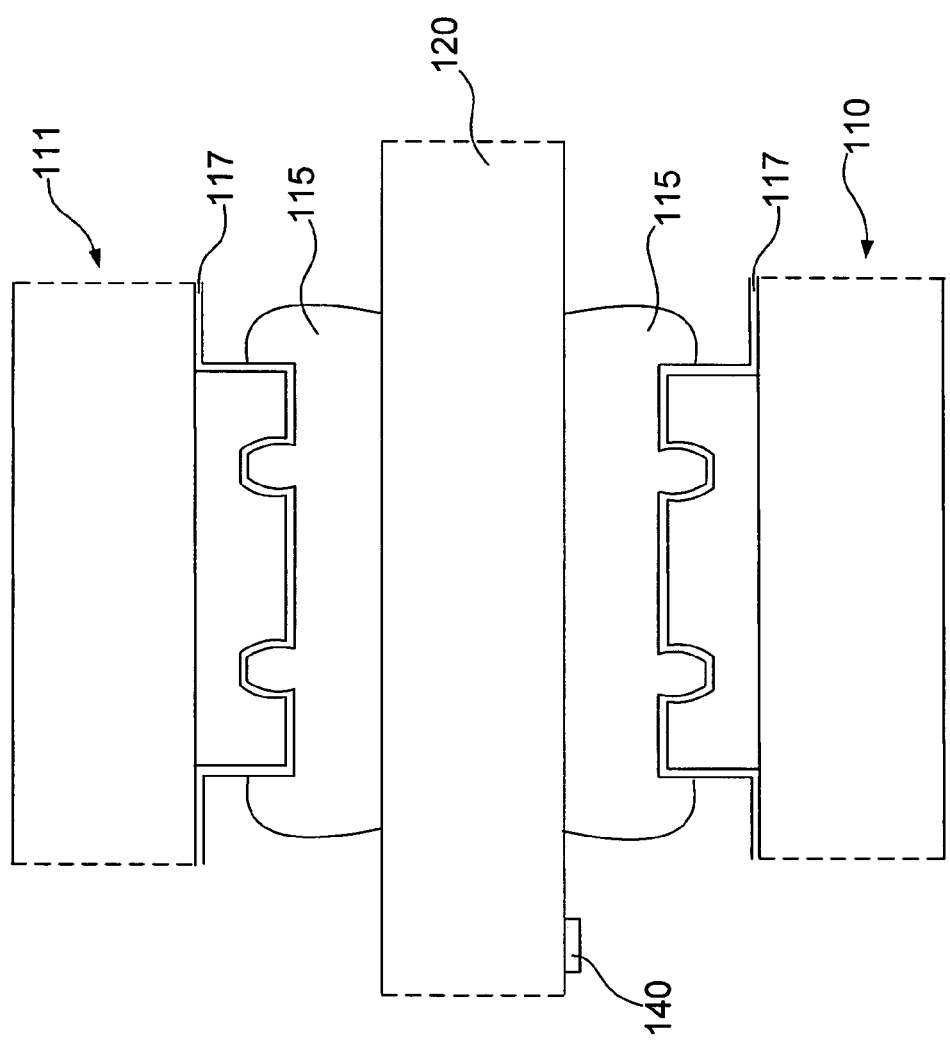

FIG. 1d shows the configuration for making optical elements on both sides of substrate 120 in accordance with the invention. The process described above is repeated with bonded stamper 111 and substrate 120 serving as a substrate to make additional optical elements.

Figure 1E:
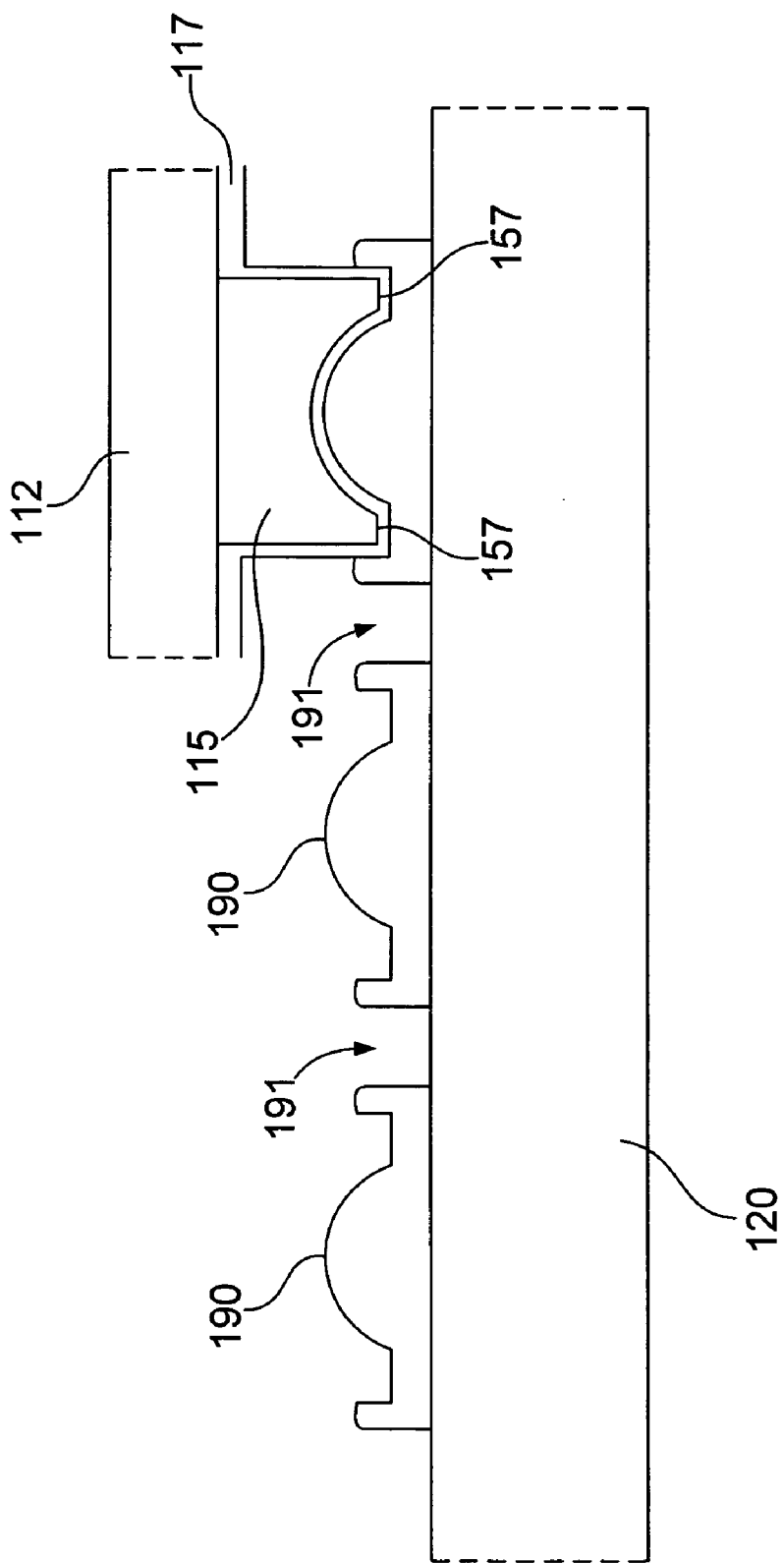

FIG. 1e shows that multiple local stampings of optical elements 190 may be made on a side of substrate 120. Stamper 112 is removed and the process is repeated as many times as necessary. Each separate stamping of optical elements 190 may use different polymer materials, different stamping molds and different curing conditions to optimize the process. This procedure may be performed in parallel where an array of stampers 112 is used with different molds and different polymer materials Molded optical elements 190 may be coated with anti-reflective coatings or reflective coatings, if desired, and substrate 120 with molded elements 190 is then typically singulated as required.

Some polymers used in accordance with the invention will not cure in the presence of air. Stamper 110 is designed such that excess optically curable polymer 115 is squeezed into areas where optically curable polymer 115 is exposed to air during the curing process. Following curing and separation of stamper 110 from substrate 120, excess uncured optically curable polymer 115 may be removed from substrate 120. For example, a solvent that preferentially dissolves uncured polymer such as acetone may be used. Hence, the remaining optical elements 190 have very little excess material allowing easy singulation and the requirements for precise volume control discussed above are relaxed.

For local stamping of optical elements, it is typically useful to have a specific shape characteristic for stampers 110. The desired shape in accordance with the invention has the molds for optical elements 190 (see FIG. 1e) contained within plateau areas 157 of polymer material. This typically allows more force to be applied to the local areas where the molding is taking place. Hence, when a fixed force is applied during the molding process (see above), the force is concentrated on plateau areas 157 where the molding is taking place instead of having the force being uniformly distributed if stampers 110 had a more planar design where gaps 191 would be missing in FIG. 1e. This results in thin field regions, typically on the order of 1 μm to 2 μm where optically curable polymer 115 is squeezed between stampers 110 and substrate 120. Excess amounts of optically curable polymer 115 forced from between stampers 110 and substrate 120 accumulate in gaps 191 at the edge of plateau areas 157 instead of being distributed as a field film over substrate 120. Also, if local dispensing of optically curable polymer 115 is used with a planar stamper having no gaps 191, excess optically curable polymer 115 will typically spread out as a large thick film over substrate 120 which is undesirable.

Figure 2A:
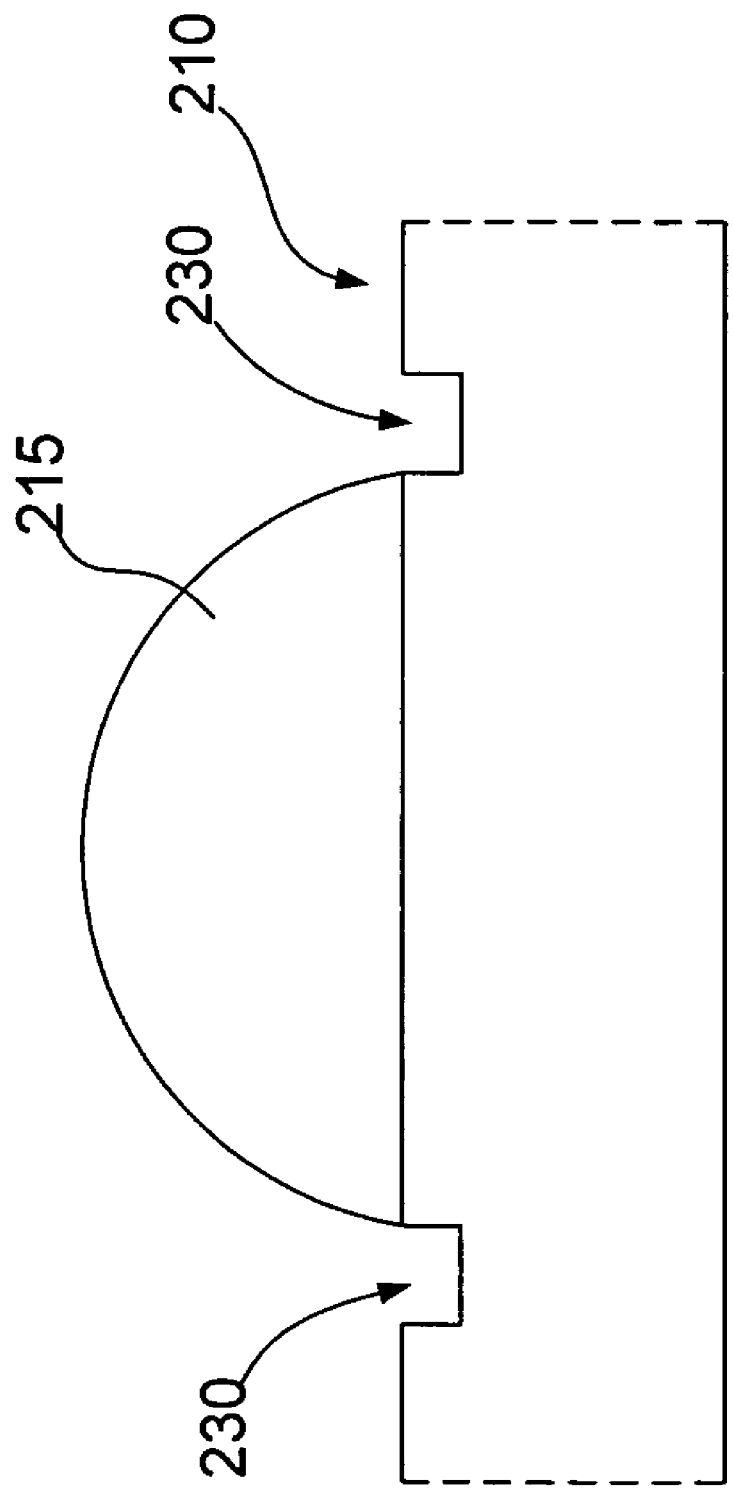
FIGS. 2a–2d show molding of a stamper from an optically curable polymer material using a master in accordance with the invention.

FIGS. 2a–2d show stamper fabrication in accordance with the invention. FIG. 2a shows stamper blank 210. Stamper blank 210 is a flat substraje which provides mechanical support for optically curable polymer 215. In accordance with the invention, stamper blank 210 is typically made of a material transparent to light.

Stamper blank 210 may be patterned with dicing marks 230. In this embodiment, locally dispensed optically curable polymer 215 will tend to pool between dicing marks 230 on the surface of stamper blank 210 as shown in FIG. 2a. Another method of patterning stamper blank 210 in accordance with the invention involves scribing the surface.

Stamper blank 210 may also be patterned so that optically curable polymer 215 will wet only specific areas. For example, as shown in FIG. 2e, release layer 218 may be patterned by a photolithographic process to allow wetting of only specific areas. Alternatively, a shadow mask may be used to pattern release layer 218. Optically curable polymer 215 is then typically dispensed locally as described above.

Figure 2B:
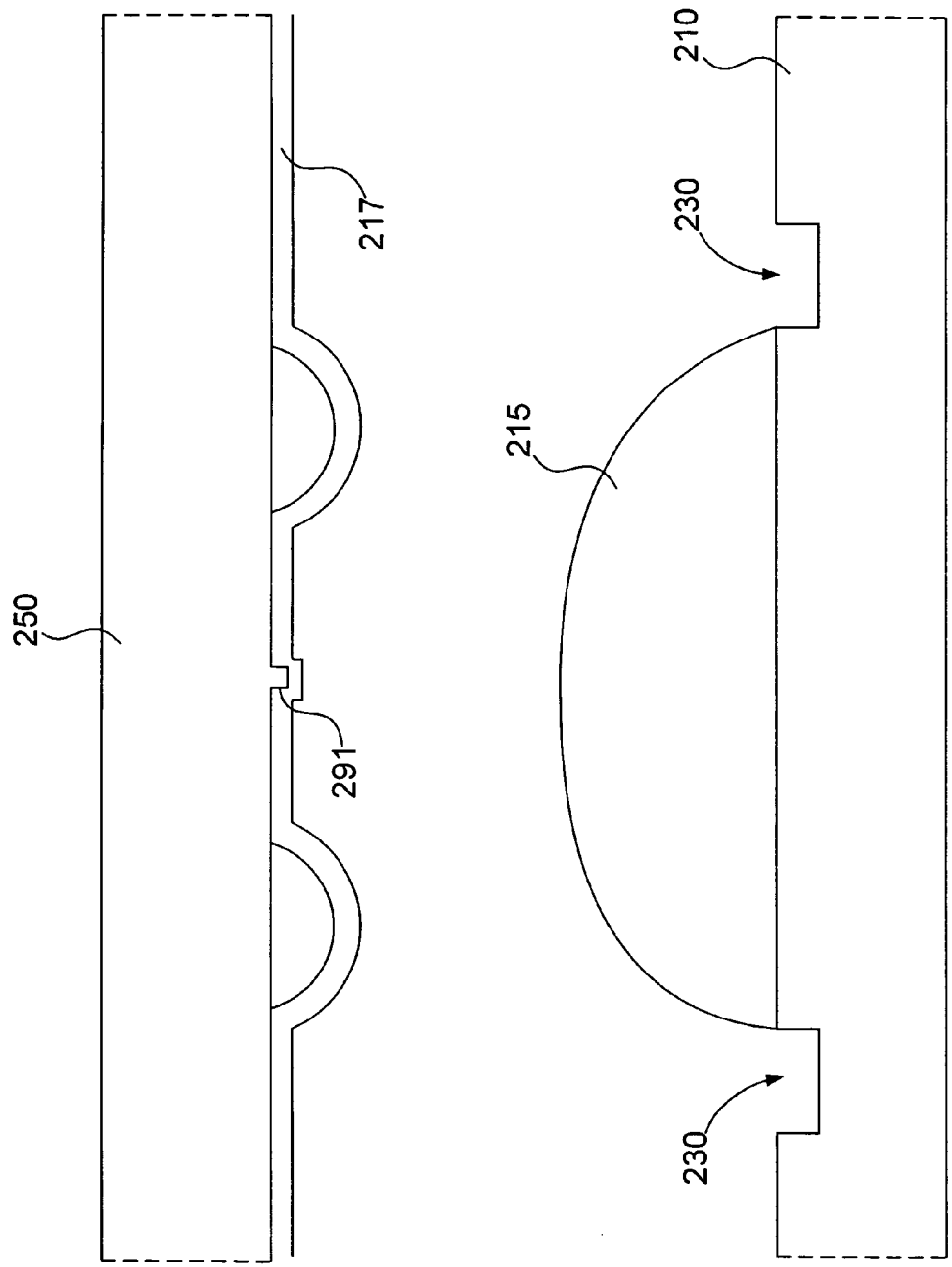

FIG. 2b shows master 250 typically coated with release layer 217 to prevent optically curable polymer 215 from sticking to master 250 and alignment of master 250 with the local areas of optically curable polymer 215 on stamper blank 210. Because master 250 does not provide an optical function, master 250 may typically be made from a wide variety of materials such as, for example, silicon, metal, glass or plastic and may be fabricated by many different methods. The features of master 250 may be made larger than the desired final features of the optical elements to accommodate shrinkage of optically curable polymer 215 during curing. Master 250 may have optional alignment features such as relief 291 that are transferred to mold 245 at the same time as the optical elements (see FIG. 2d).

Figure 2C:
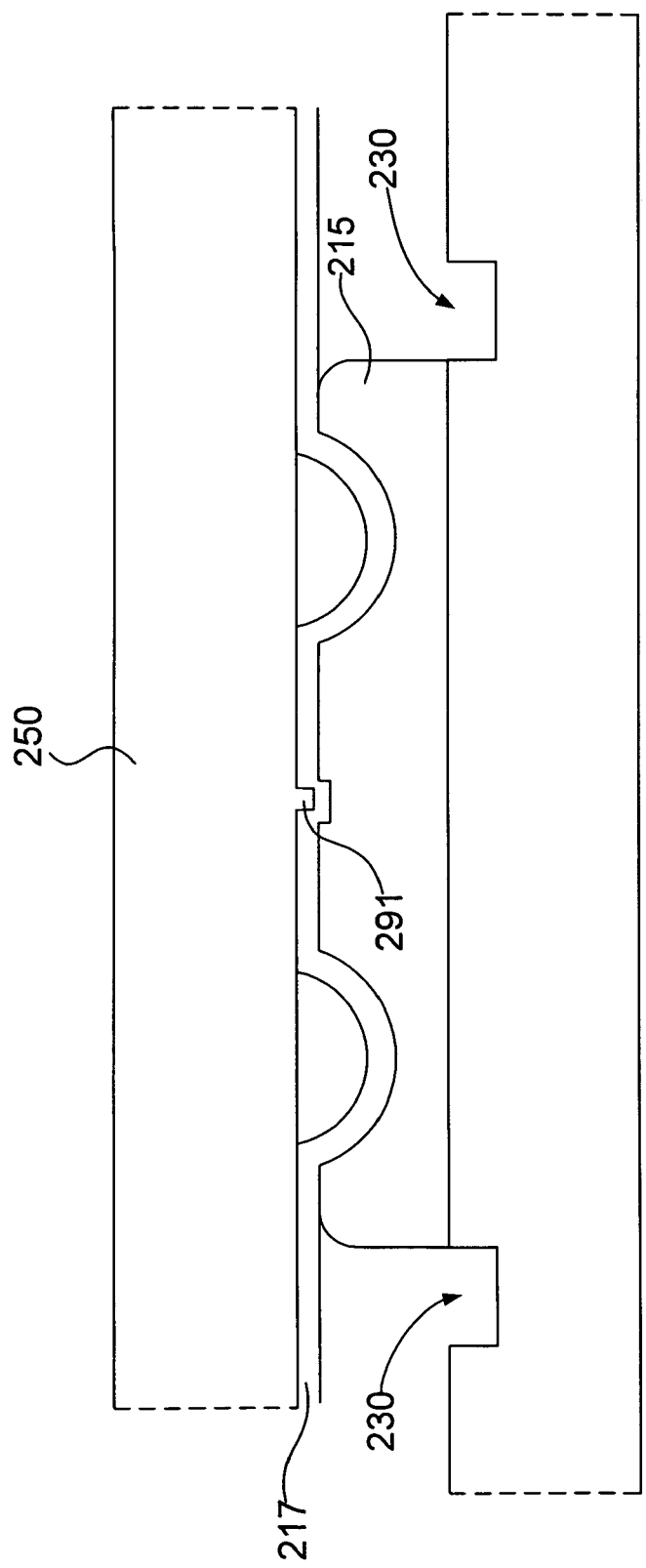
Figure 2D:
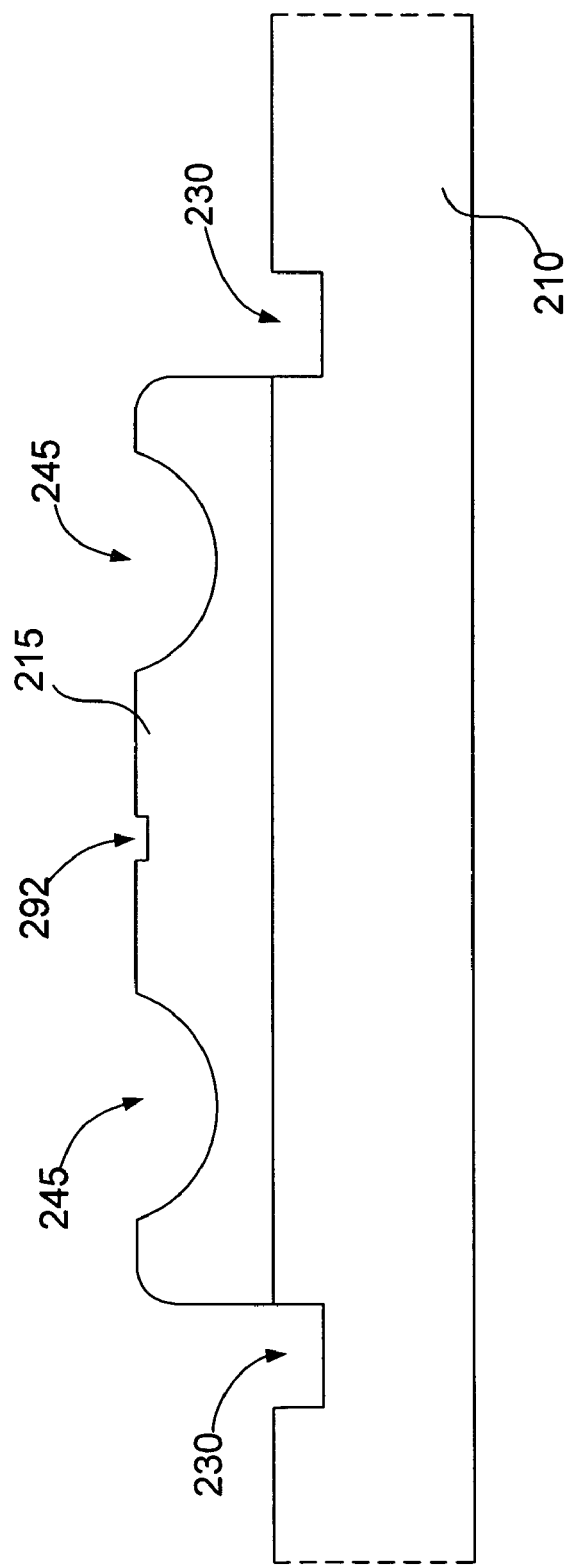
Figure 2E:
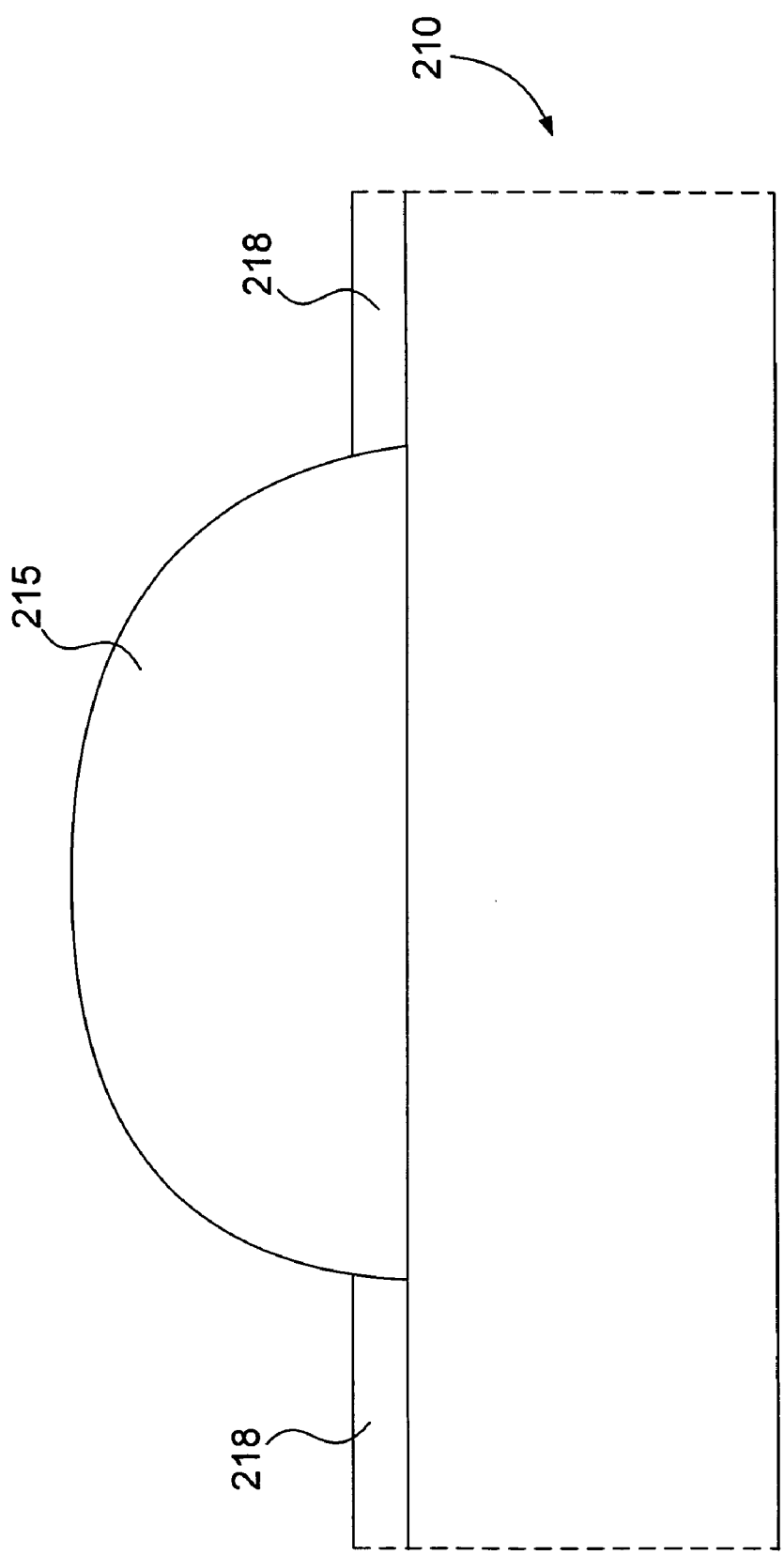
FIG. 2e shows an alternative to FIG. 2a in accordance with the invention.

Parallelism of stamper blank 210 and of master 250 is adjusted accordingly in FIG. 2b Then, stamper blank 210 and master 250 are brought into contact as shown in FIG. 2c. External force may be provided to hold stamper blank 210 and master 250 in contact. Light is applied to cure optically curable polymer 215. FIG. 2d shows resulting stamper 211 with mold 245 separated from master 250 including optional alignment feature 292 transferred to mold 245 through use of relief 291.

Figure 3A:
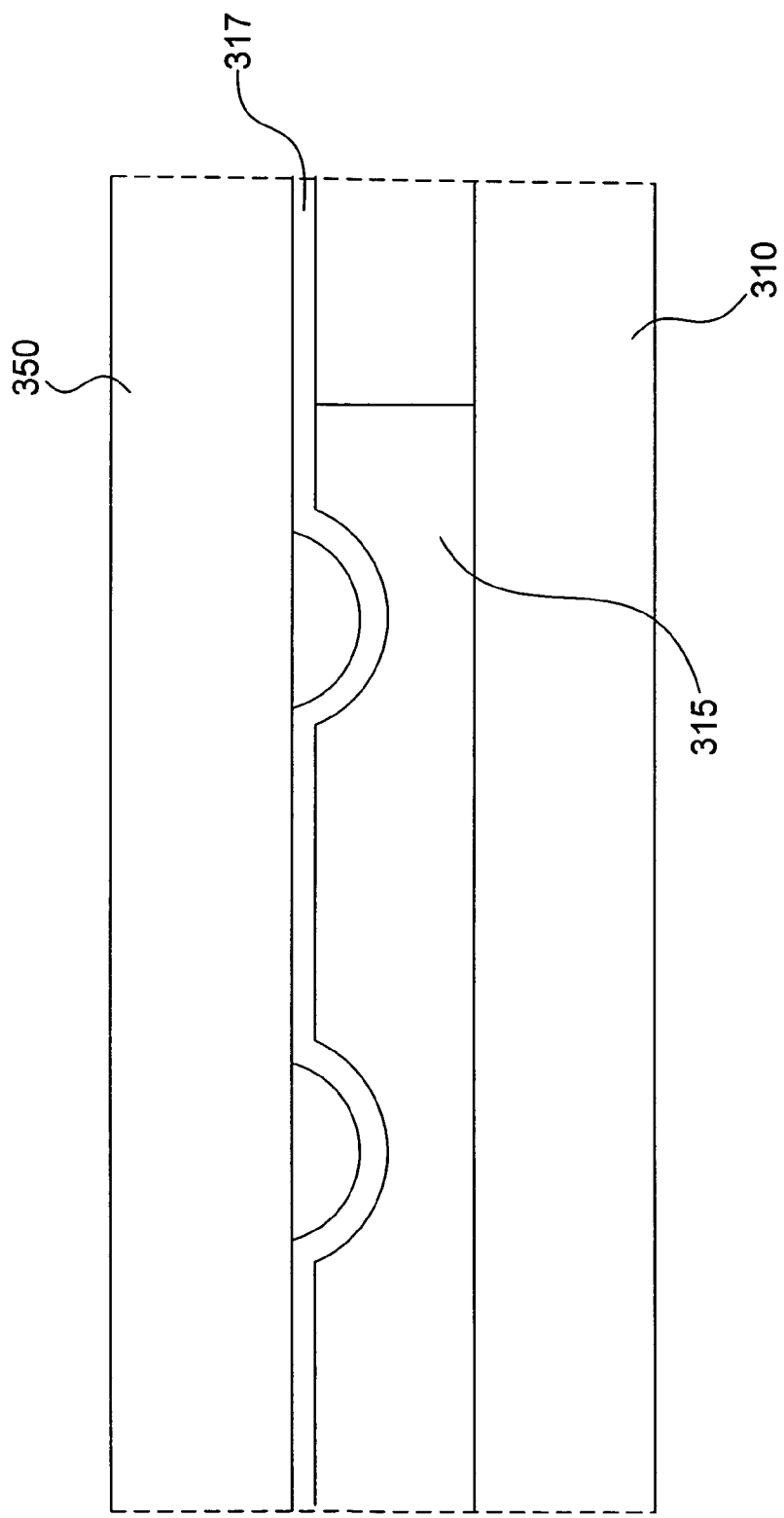
FIGS. 3a–3b show another method for molding of a stamper from an optically curable polymer material using a master in accordance with the invention.
Figure 3B:
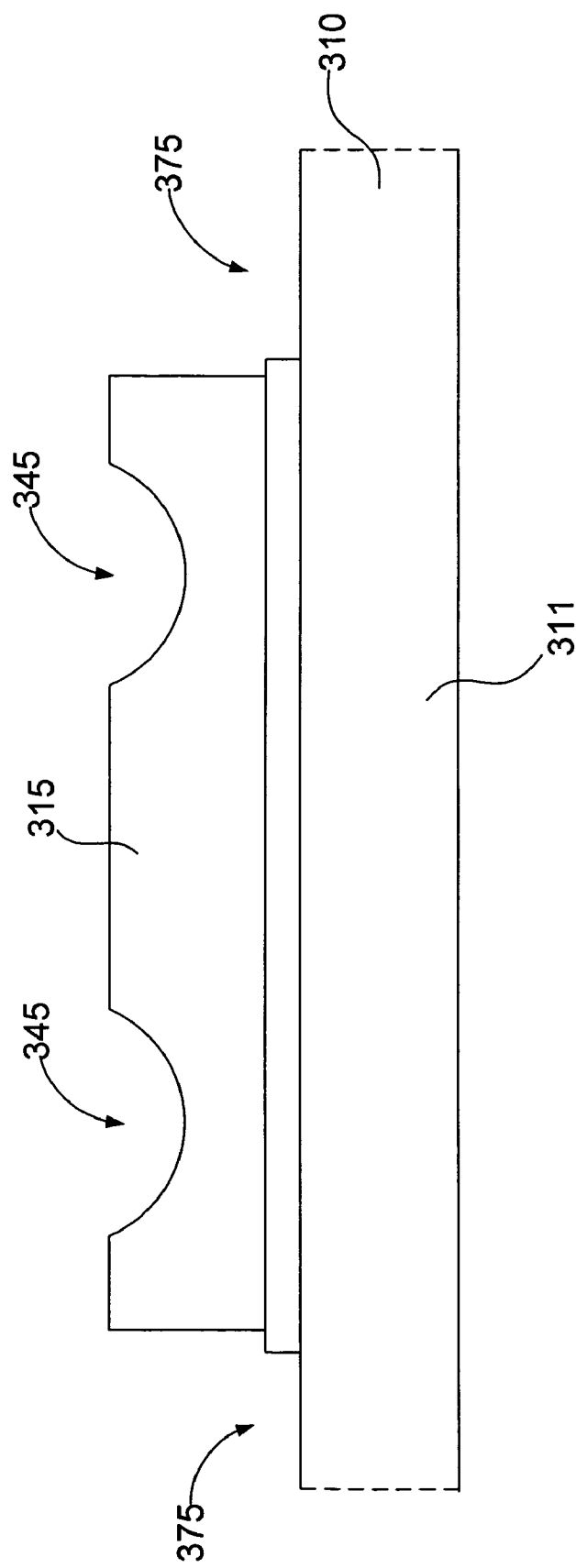

FIGS. 3a–3b show stamper fabrication in accordance with the invention. With reference to FIG. 3a, stamper blank 310 is coated with a blanket layer of optically curable polymer 315 using dip coating, spray coating or other suitable coating methods. Master 350 is coated with release layer 317 to prevent optically curable polymer 315 from sticking to master 350. Stamper blank 310 is brought into contact with master 350 while parallelism of stamper blank 310 and master 350 is maintained. Light is used to cure optically curable polymer 315. FIG. 3b shows resulting mold 345 and stamper 311. Stamper blank 310 and master 350 are separated after optically curable polymer 315 is cured. Regions 375 are removed either mechanically by dicing or milling or chemically by etching to provide stamper 311. The process may remove just the excess portion of optically curable polymer 315 or also part of stamper blank 310.

Figure 4A:
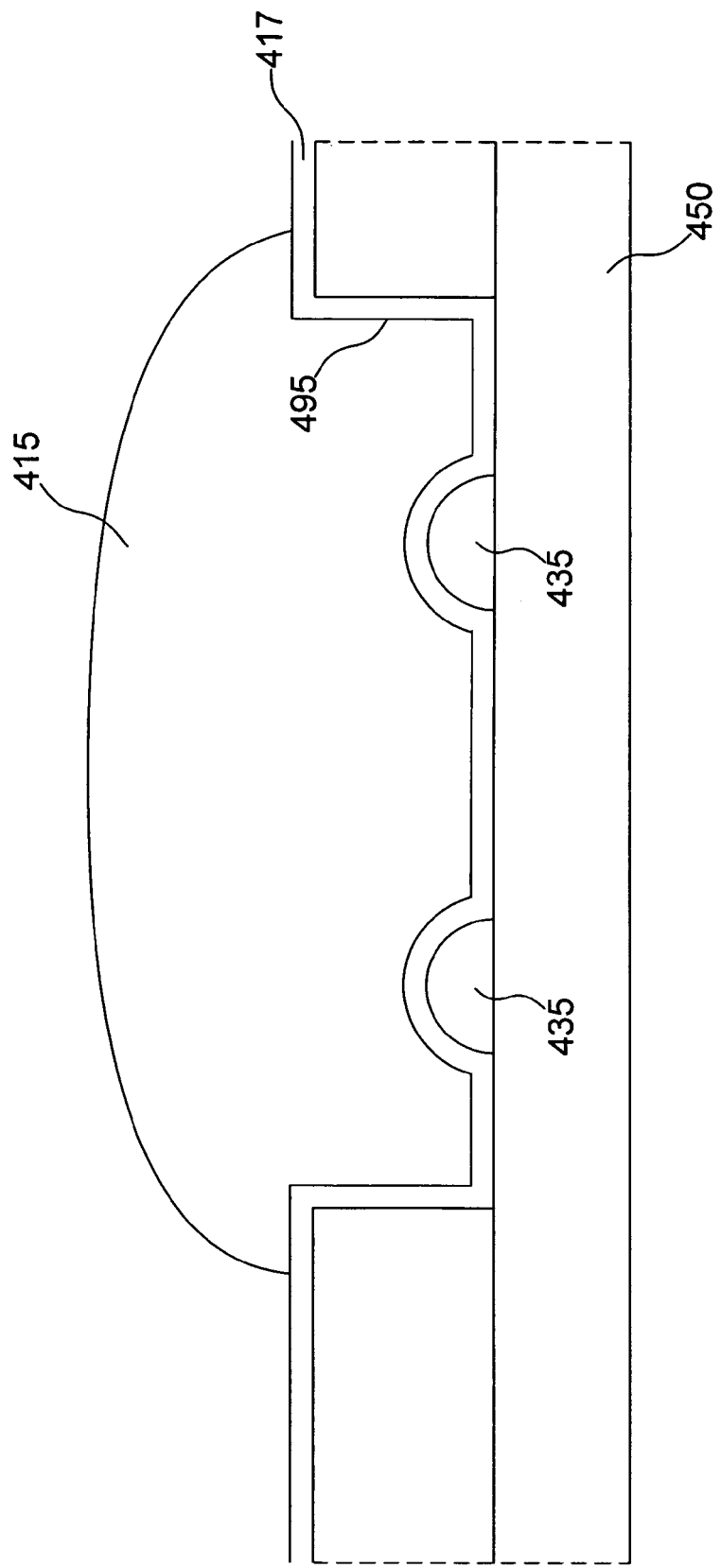
FIGS. 4a–4c show molding a stamper from an optically curable polymer material where optical elements are formed at the bottom of a cavity in accordance with the invention.
Figure 4B:
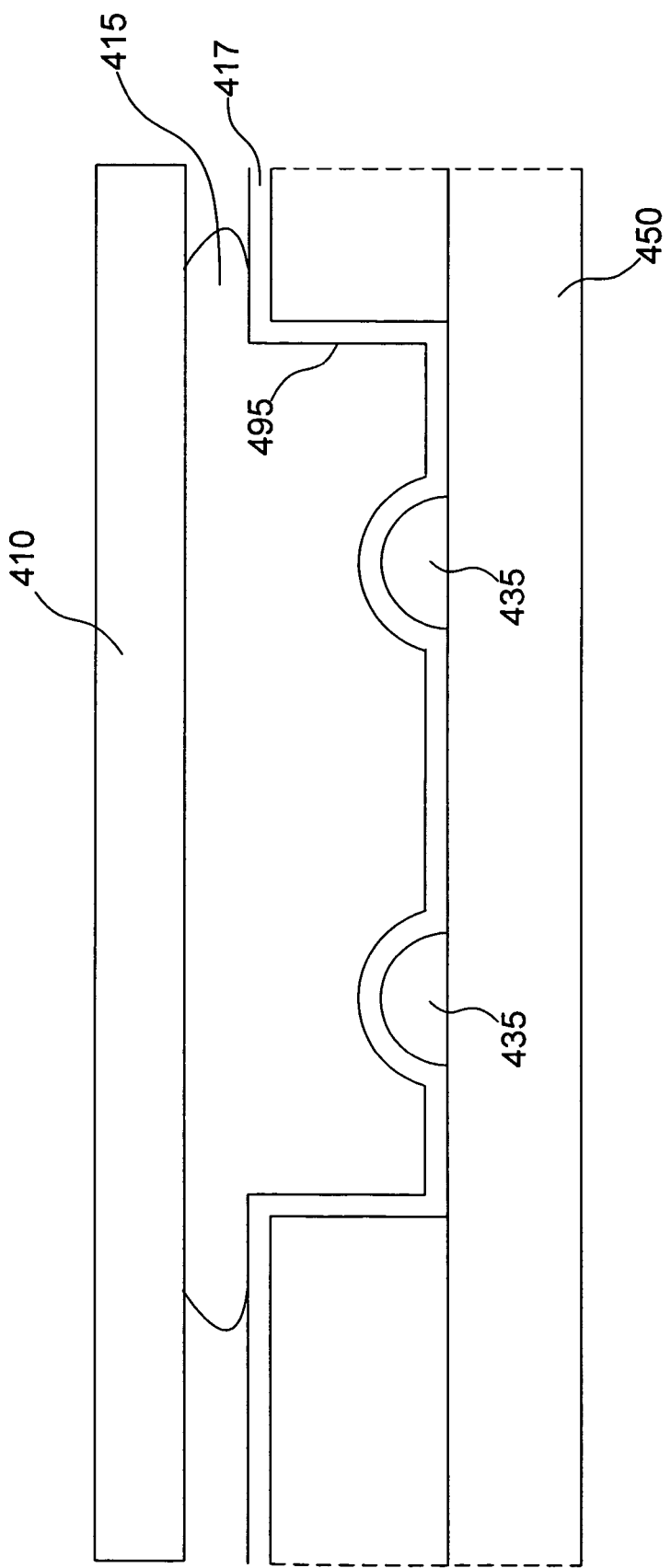
Figure 4C:
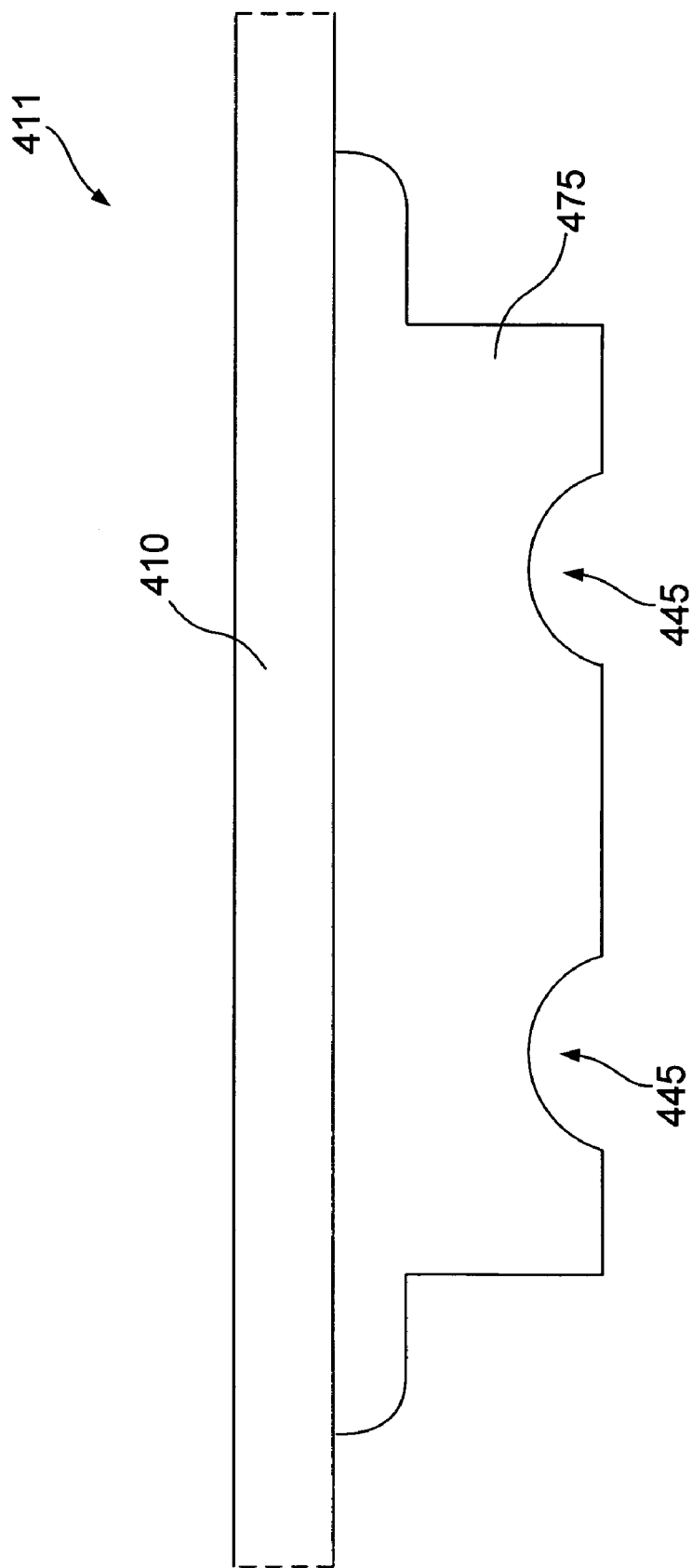

FIGS. 4a–4c show stamper fabrication in accordance with the invention. Master 450 has optical element shapes 435 formed at the bottom of cavity 495. Master 450, including optical element shapes 435 are typically coated with release layer 417. Optically curable polymer 415 is locally dispensed on master 450 to fill cavity 495 as shown in FIG. 4a. In practice, there typically are a number of cavities 495 with optical element shapes 435 on master 450 to allow creation of stampers 411 in parallel.

FIG. 4b shows master 450 with dispensed optically curable polymer 415 and stamper blank 410 being brought into contact with one another. Light is then used to cure optically curable polymer 415. Finally, master 450 and stamper blank 410 are separated leaving stamper 411 with cured mold 445.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for making molded optical elements on selected areas on a surface of a substrate comprising:
   providing a first and second stamper each comprising a mold, said first and said second stamper being separated by a gap;
   coating said molds with a locally dispensed optically curable polymer;
   bringing said selected area on said surface of said substrate into contact with said coated molds;
   exposing said surface of said substrate in contact with said coated molds to light; and
   separating said substrate from said molds to leave said molded optical elements on said selected areas on said surface of said substrate.

2. The method of claim 1 wherein said first and said second stampers are coated with a release layer.

3. The method of claim 1 wherein said locally dispensed optically curable polymer is mechanically dispensed onto said molds.

4. The method of claim 1 wherein said locally dispensed optically curable polymer is dispensed by bringing said molds into contact with a reservoir of optically curable polymer.

5. The method of claim 1 further comprising placing said coated molds into a vacuum chamber for degassing.

6. The method of claim 1 wherein said substrate is substantially transparent to light.

7. The method of claim 1 wherein said substrate is substantially reflective to light.

8. The method of claim 1 wherein said surface of said substrate is prepared to enhance adhesion of said optically curable polymer when said optically curable polymer is cured.

9. The method of claim 1 wherein an alignment mark is patterned on said surface of said substrate.

10. The method of claim 1 wherein thin metal elements are patterned on said surface of said substrate for optical functions.

11. The method of claim 1 wherein the dimensions of said gap are determined by the separation distance between said substrate and said molds when said optically curable polymer begins to flow.

12. The method of claim 1 wherein providing said first stamper comprises:
    coating a stamper blank with said locally dispensed optically curable polymer;
    providing a master;
    bringing said master into contact with said locally coated stamper blank;
    exposing said locally coated stamper blank in contact with said master to light; and
    separating said master from said locally coated stamper blank to create said first stamper.

13. The method of claim 12 wherein said master is coated with a release layer.

14. The method of claim 12 wherein said master is made from a material chosen from the group consisting of silicon, metal, glass, and plastic.

15. The method of claim 12 wherein said master has an alignment feature which is transferred to said first stamper.

16. The method of claim 1 wherein providing said first stamper comprises:
    coating a stamper blank with a blanket layer of optically curable polymer;
    providing a master;
    bringing said coated stamper blank into contact with said master;
    exposing said coated stamper blank in contact with said master to light;
    separating said coated stamper blank from said master; and
    removing excess material from said coated stamper blank to create said first stamper.

17. The method of claim 16 wherein said master is coated with a release layer.

18. The method of claim 16 wherein said excess material is removed by chemical etch.

19. The method of claim 1 wherein providing said first stamper comprises:
    providing a master comprising a cavity wherein optical element shapes are disposed;
    overfilling said cavity with said locally dispensed optically curable polymer;
    bringing a stamper blank into contact with said optically curable polymer;
    exposing said stamper blank and said optically curable polymer to light; and
    separating said master from said stamper blank leaving said optically curable polymer attached to said stamper blank to create said first stamper.

20. The method of claim 19 wherein said cavity of said master is coated with a release layer.

* * * * *